(12) United States Patent
Gal et al.

(10) Patent No.: US 8,365,850 B2
(45) Date of Patent: Feb. 5, 2013

(54) SELF-POWERED VEHICLE WITH SELECTABLE OPERATIONAL MODES

(75) Inventors: Shai Gal, Jordan Valley (IL); Arie Becker, Kibbutz Afikim (IL)

(73) Assignee: Golfit Ltd. (IL)

( * ) Notice: Subject to any disclaimer, the term of this patent is extended or adjusted under 35 U.S.C. 154(b) by 950 days.

(21) Appl. No.: 11/996,652

(22) PCT Filed: Jul. 28, 2006

(86) PCT No.: PCT/IL2006/000879
§ 371 (c)(1),
(2), (4) Date: Jan. 24, 2008

(87) PCT Pub. No.: WO2007/013084
PCT Pub. Date: Feb. 1, 2007

(65) Prior Publication Data
US 2008/0196951 A1    Aug. 21, 2008

(30) Foreign Application Priority Data

Jul. 28, 2005   (IL) .......................... 169952
Jul. 27, 2006   (IL) .......................... 177121

(51) Int. Cl.
*B62D 51/00* (2006.01)
(52) U.S. Cl. .. 180/65.1; 180/209; 180/19.1; 280/DIG. 5
(58) Field of Classification Search ............. 280/DIG. 5, 280/DIG. 6; 180/908, 208, 209, 210, 215, 180/216, 19.1, 19.2
See application file for complete search history.

(56) References Cited

U.S. PATENT DOCUMENTS

| | | | | |
|---|---|---|---|---|
| 3,434,558 A | * | 3/1969 | Allen | 180/208 |
| 4,538,695 A | * | 9/1985 | Bradt | 180/19.2 |
| 4,844,493 A | * | 7/1989 | Kramer | 180/169 |
| 4,848,504 A | | 7/1989 | Olson | |
| 4,874,055 A | | 10/1989 | Beer | |
| 4,878,339 A | * | 11/1989 | Marier et al. | 56/14.7 |
| 5,346,028 A | | 9/1994 | Cassano | |
| 6,139,032 A | | 10/2000 | Hartman | |
| 6,474,427 B1 | * | 11/2002 | Tunnecliff | 180/19.1 |

FOREIGN PATENT DOCUMENTS

| | | |
|---|---|---|
| DE | 102 40 846 | 3/2004 |
| GB | 2 242 404 | 10/1991 |
| GB | 2 306 925 | 5/1997 |
| JP | 49-121252 | 10/1974 |
| JP | 50-9076 | 1/1975 |

OTHER PUBLICATIONS

International Search Report and Written Opinion dated Nov. 17, 2006 issued in corresponding PCT Application No. PCT/IL2006/00879.

* cited by examiner

*Primary Examiner* — Katy M Ebner
(74) *Attorney, Agent, or Firm* — Ostrolenk Faber LLP

(57) ABSTRACT

There is provided a battery powered golf cart with selectable dual operative modes, walk-behind/ride-on modes, including three units: a drive/riding unit, a golf bag support unit, and a front caster wheel assembly. The three units are interconnected for cooperative association in the two operative modes by a bar linkage system, having two stable positions.

18 Claims, 17 Drawing Sheets

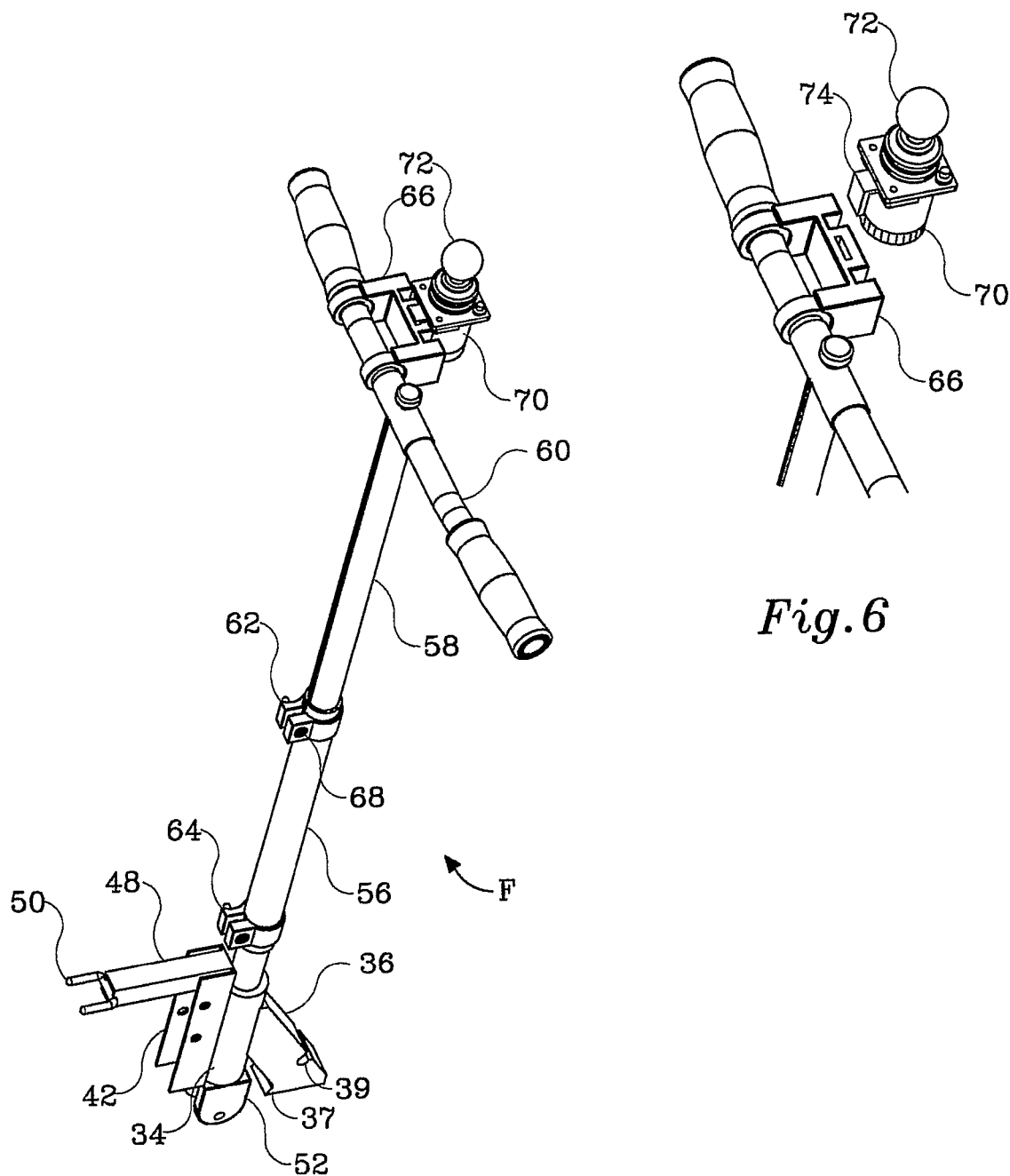

SELF-POWERED VEHICLE WITH SELECTABLE OPERATIONAL MODES

CROSS REFERENCE TO RELATED APPLICATION

The present application is a 35 U.S.C. §§371 national phase conversion of PCT/IL2006/000879, filed Jul. 28, 2006, which claims priority of Israeli Patent Application No. 169952, filed Jul. 28, 2005, and Israeli Patent Application No. 177121, filed Jul. 27, 2006, the disclosures of which have been incorporated herein by reference. The PCT International Application was published in the English language.

FIELD OF THE INVENTION

The present invention relates to power golf carts, and more particularly, to a self-propelled battery driven, collapsible, golf cart having two selectable operational modes.

The two selectable modes are a riding operational mode, in which the golfer stands on the cart while traveling around the golf course, and the second is a walking operational mode in which the golfer walks behind the cart while the cart is in use, wherein the golf bag containing the golf club set, and possible other articles, are supported on suitable supports provided on the cart.

BACKGROUND OF THE INVENTION

Many golfers need and desire the exercise afforded by walking at least part of the way during a round of golf, but they find that if they walk all the way around the nine or eighteen holes that they play, it can range up to five hours, which is often tiring, especially when difficult terrain is encountered. If the golfer uses one of the conventional motorized golf carts to ride in across the golf course, the cart must be driven all the way around the course, eliminating the desired walking exercise. On the other hand, if the golfer chooses to walk around the course, either carrying his bag himself, normally weighing up to twenty kilograms, or applying it to one of the numerous available forms of bag carts, whether of the common hand push or pull type, or of a power driven (trolley) type, the golfer must also walk all the way around the course, since it is only the golfer's club bag that is transported by the cart.

The need for a collapsible golf cart, convertible between a walking-behind mode and a ride-on mode, which will allow a golfer to use the cart as a walking cart for some holes and as a riding cart for the remaining holes, was identified, and some solutions suggested, such as disclosed in U.S. Pat. Nos. 6,474,427; 5,346,028; 4,874,055; 4,848,504; 4,538,695; UK Patent GB2242404A; WO-2004/03K16-A1; EU Patent 0602300A1.

Most of the suggested solutions deal with merely changing the steering column inclination angle, such that it is inclined forwards for the pull-behind walking mode, or inclined rearwards for the more desired walk-behind mode. Such a big change of the steering column inclination angle, necessary to overcome the very different geometrical positions of the walk-behind mode and the ride-on mode, makes the inclined position difficult for steering, as large hand movements are required. Furthermore keeping the wheel base length constant in both modes makes it even more difficult to steer a long cart, which is a necessity for the ride-on mode, at the walk-behind mode.

Only two of the above-mentioned patents deal with changing the wheel base length when selecting between the ride-on and walk behind modes.

U.S. Pat. No. 4,848,504 suggests a detachable riding unit that can be detached from the trailing point on the drive unit and attached to a higher point on the steering column, clearing the ground behind the drive unit to the walking behind user. The suggested solution, however, requires coordination skills from the user, since the drive unit has only two wheels and the ground support located under the golf bag should be lifted from the ground during driving, along with steering the cart.

U.S. Pat. No. 6,474,427 discloses a motorized golf cart, with an extendible wheel base in which the front wheel assembly, having the steering member, is moved forward from the rear wheel assembly to extend the wheel base of the buggy, when selecting between walk-behind and ride-on modes. The drawbacks of the suggested solution, however, lie in their complexity, requiring a mechanism with sliding arms and mating gears. Furthermore, the user must take special action when mode selection is desired.

SUMMARY OF THE INVENTION

It is therefore a broad object of the present invention to provide a battery powered, collapsible, golf cart with selectable dual operative modes, walk-behind/ride-on modes, having substantially the same steering effectiveness in both modes and a selectable wheel base easily set according to the selected operative mode.

In accordance with the present invention, there is provided a battery powered golf cart with selectable dual operative modes, walk-behind/ride-on modes, comprising three units, a drive/riding unit, a golf bag support unit, and a front caster wheel assembly, said three units being interconnected for cooperative association in said two operative modes by a bar linkage system, having two stable positions.

The invention further provides a battery-powered golf cart with selectable dual operative modes, walk-behind/ride-on modes, comprising two units, a drive/riding unit, and steering column assembly unit, said two units being interconnected for cooperative association in said two operative modes by a bar linkage system, having two stable positions.

Additionally in the preferred embodiment of the present invention the drive/riding unit further comprising a pair of laterally spaced, independent, right and left drive assemblies, powered by an electronic differential unit, that on demand of steering, applies more power to one drive assembly and less power to the opposing drive assembly.

In a second embodiment of the present invention, there is provided a battery powered golf cart with selectable dual operative modes, walk-behind/ride-on modes, comprising two units, a drive/riding unit, and steering column assembly unit. The two units are interconnected for cooperative association in the two operative modes by a bar linkage system, having two stable positions.

Additionally, in the above second embodiment, the steering column assembly includes a steerable handle bar linked to a pair of steering wheels.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a general side view of a dual mode walking/riding golf cart, the operational mode selected for walking, showing a user walking behind the cart;

FIG. 2 is a side view similar to FIG. 1 with the operational mode selected for riding, showing a user riding the cart;

FIG. 3 is a perspective view from the back of the cart, operatively selected for the riding mode;

FIG. 4 is a perspective view from the back end of the cart, operatively selected for the walking mode;

FIG. 5 is a view of the upper portion of FIG. 3 in a different perspective view;

FIG. 6 is an enlargement of the upper portion of FIG. 5;

FIG. 7 is a perspective view as in FIG. 3, showing only the bottom portion;

FIG. 8 is an enlargement of the bottom portion of FIG. 5 in a different perspective view;

FIG. 9 is a side view of the cart, with the operational mode selected for riding and the golf bag removed;

FIG. 10 is a side view of the cart, with the operational mode selected for walking;

FIG. 11 is a perspective view from the back of the cart, the cart dismantled to three pieces;

Figure 11:
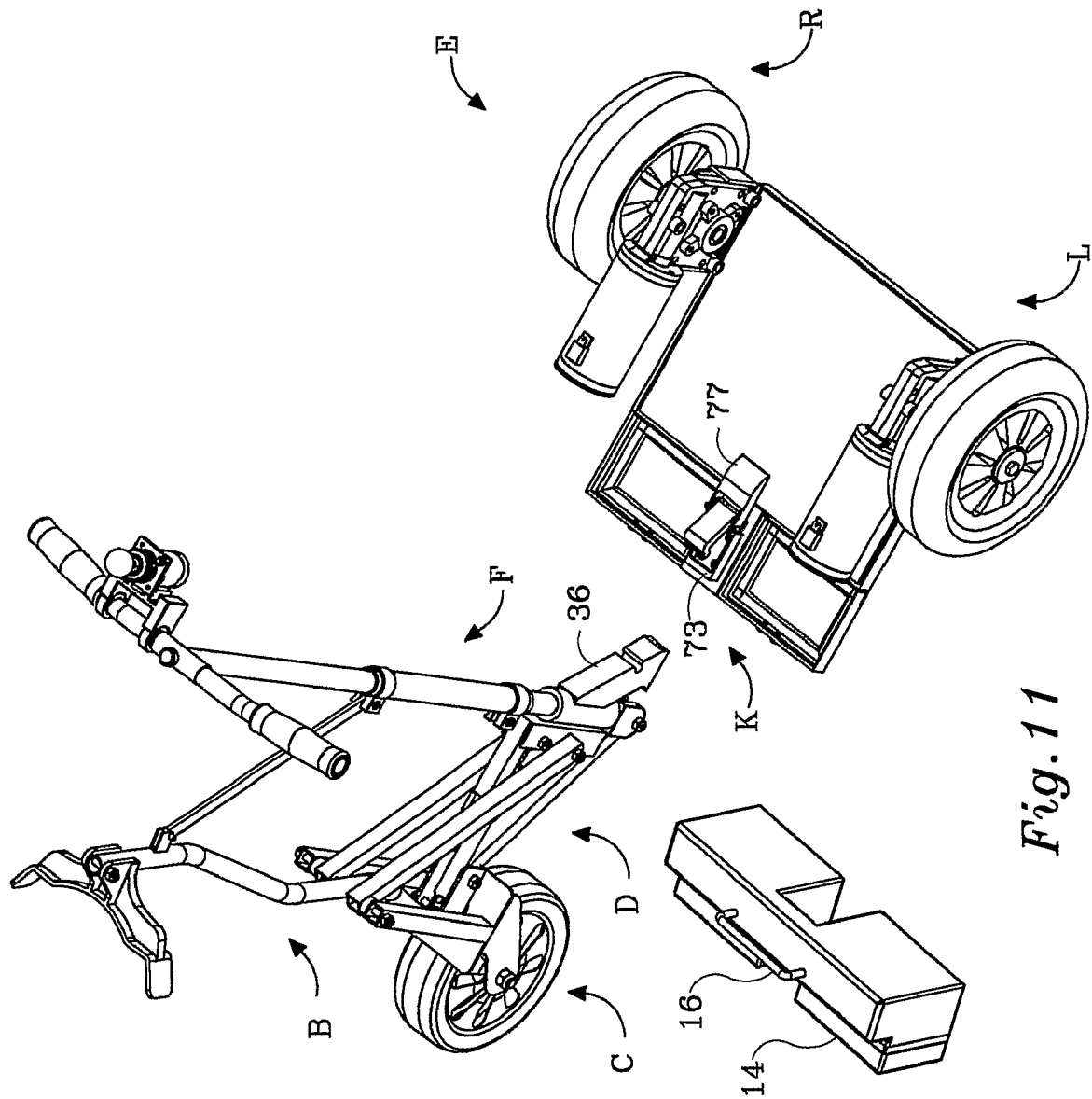
Figure 12:
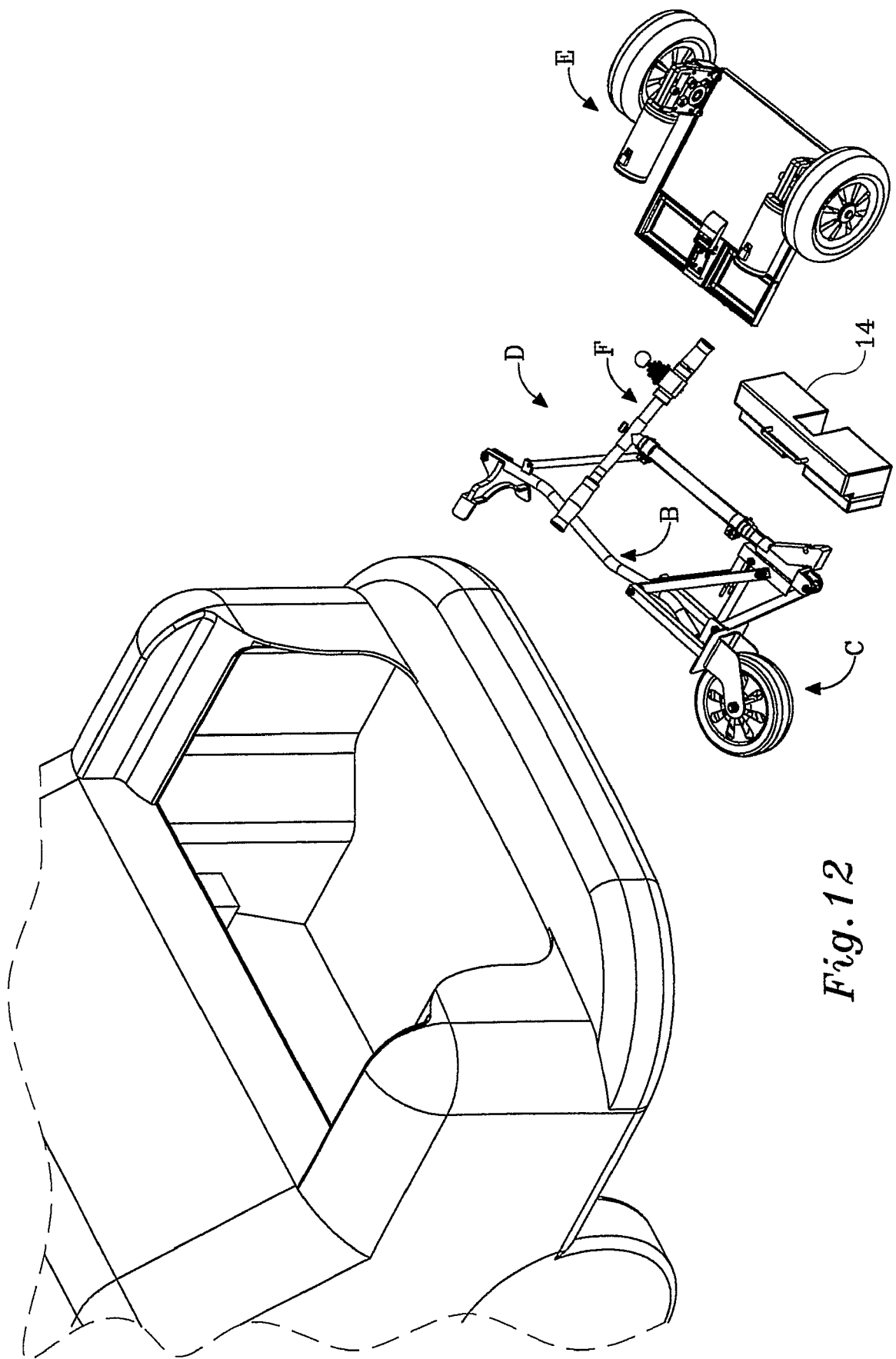
Figure 13:
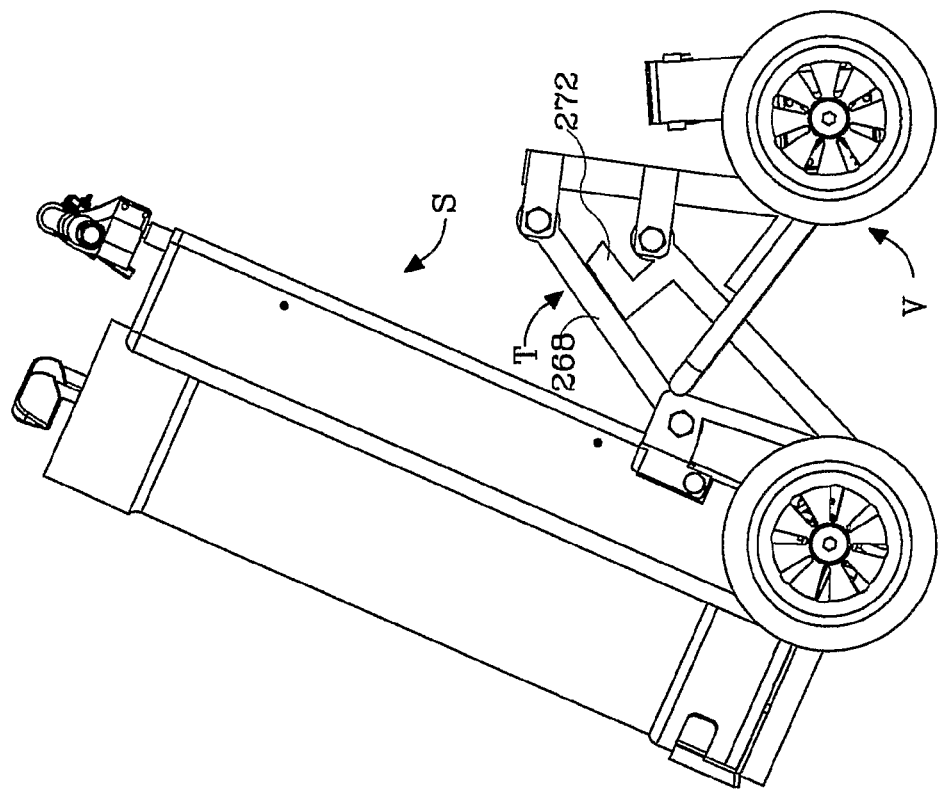
Figure 14:
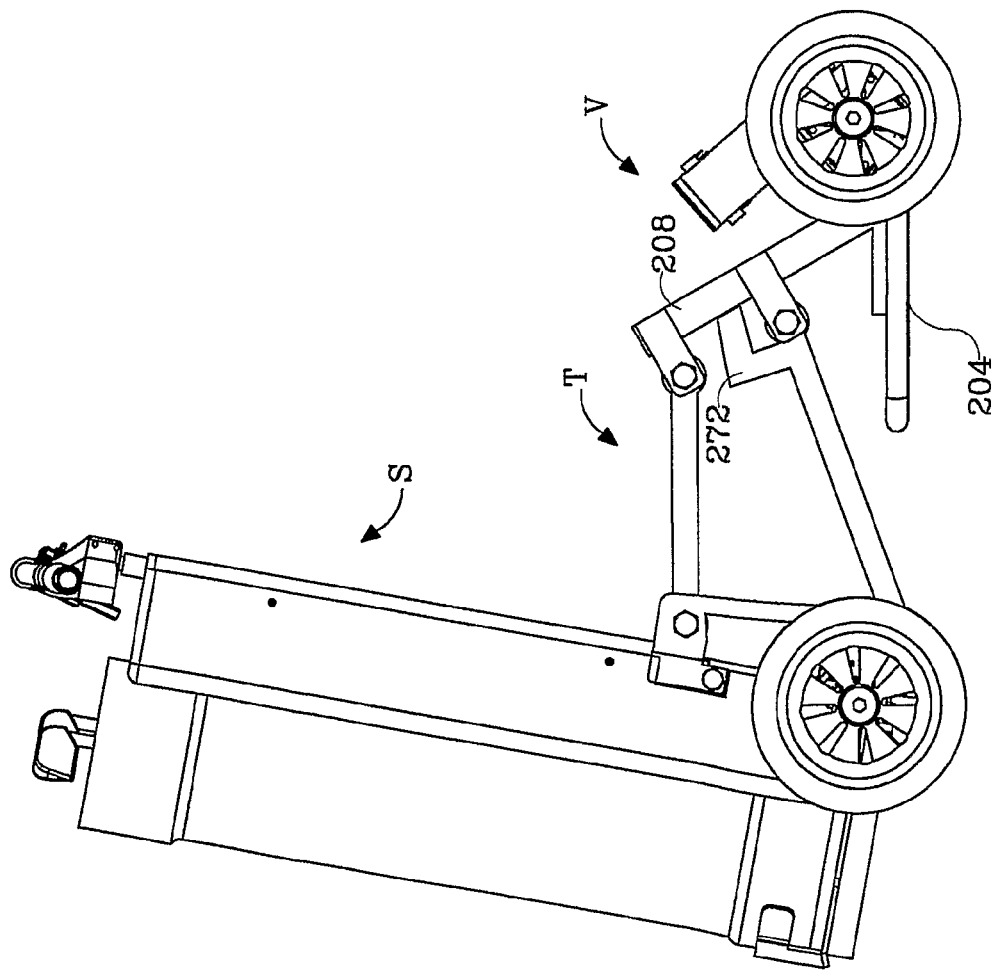
Figure 15:
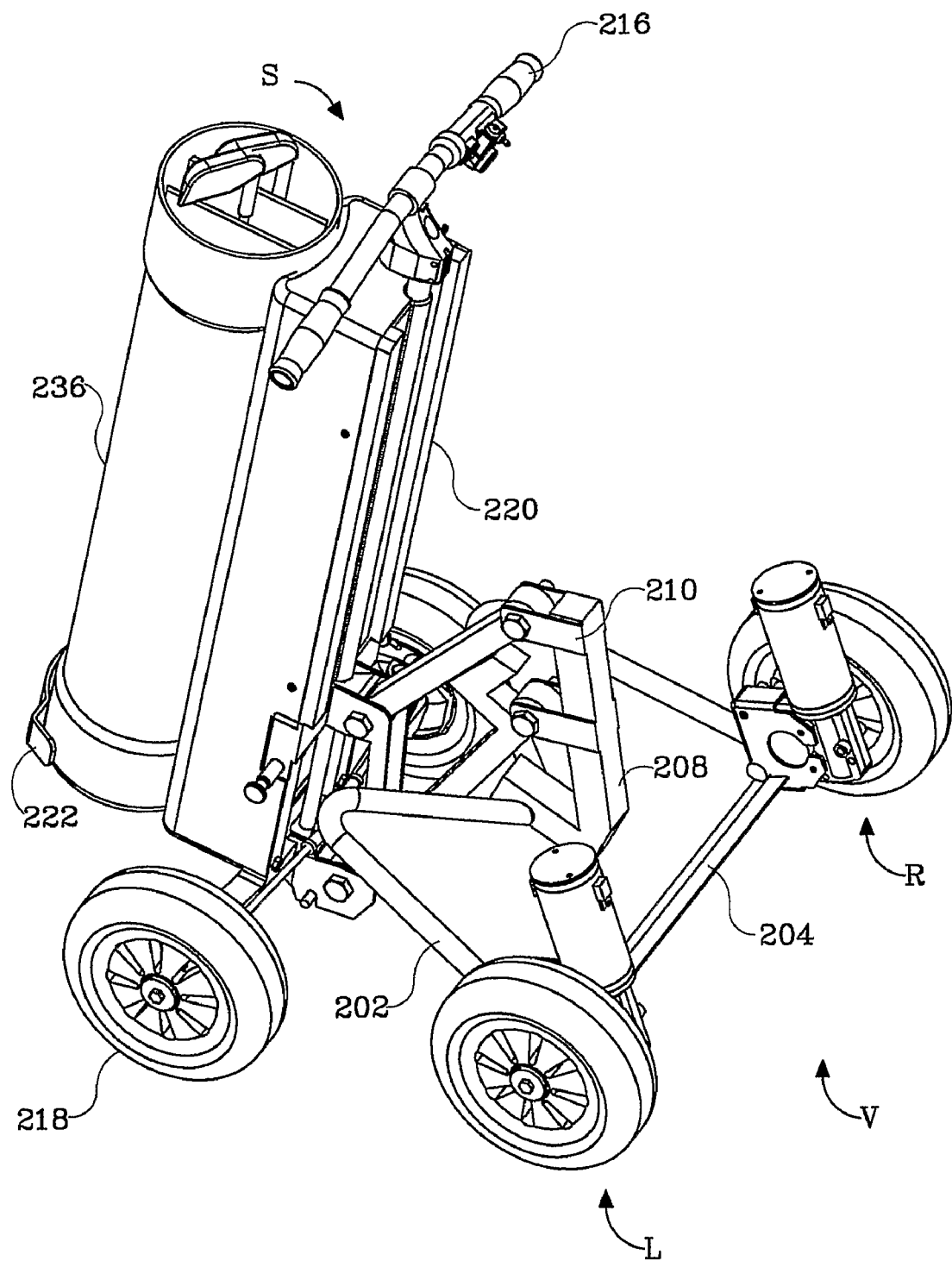
Figure 16:
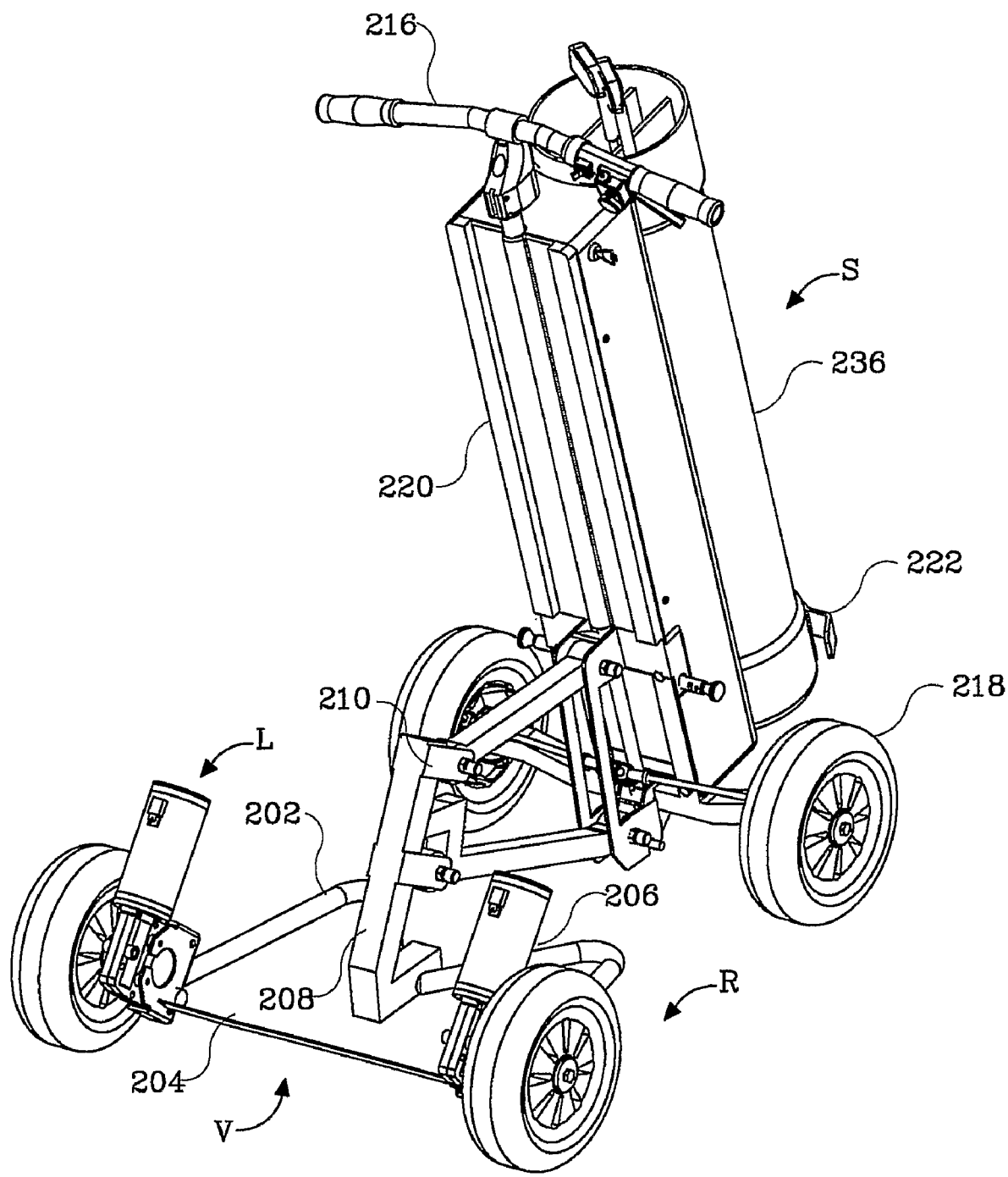
Figure 17:
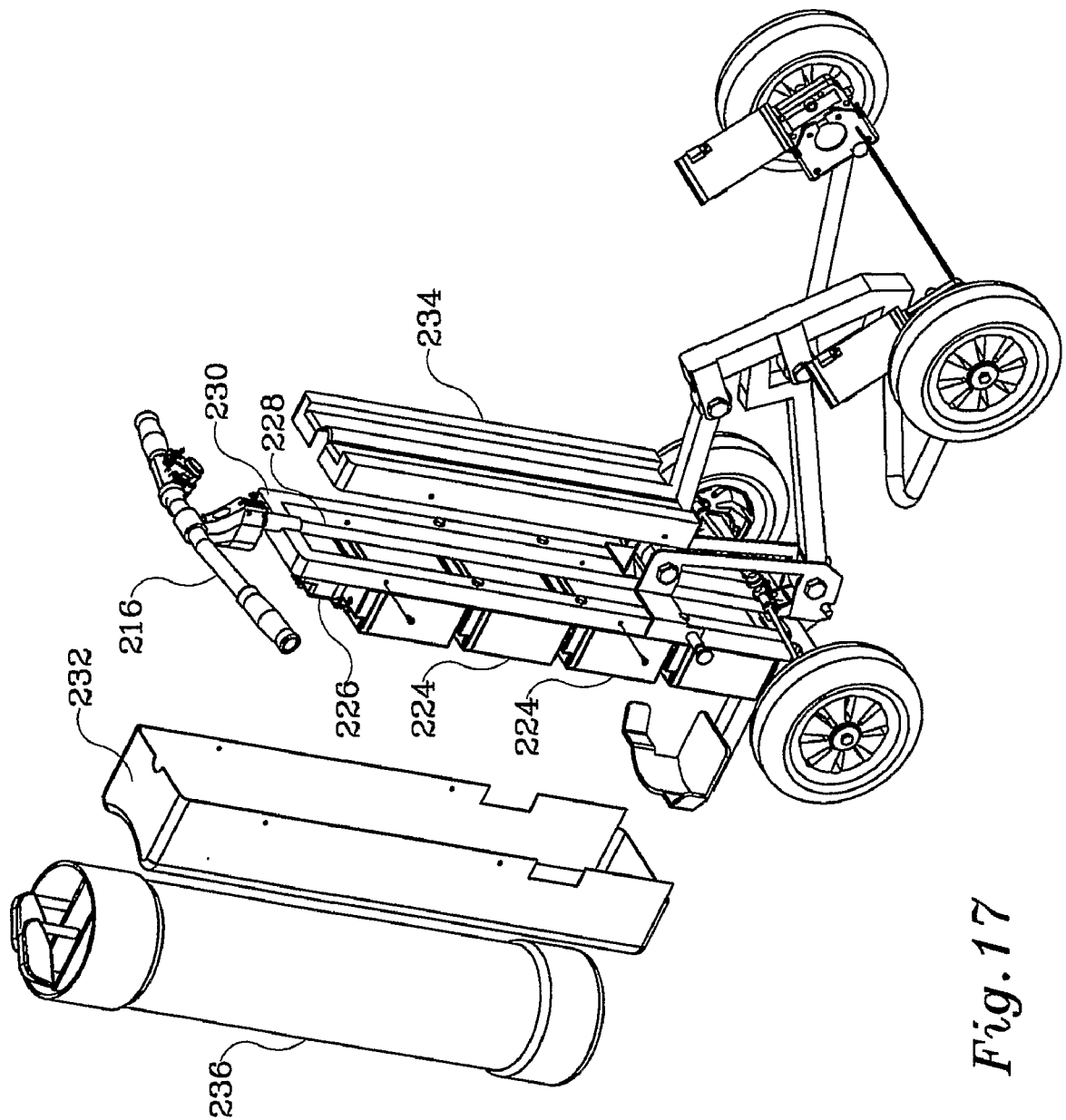
Figure 18:
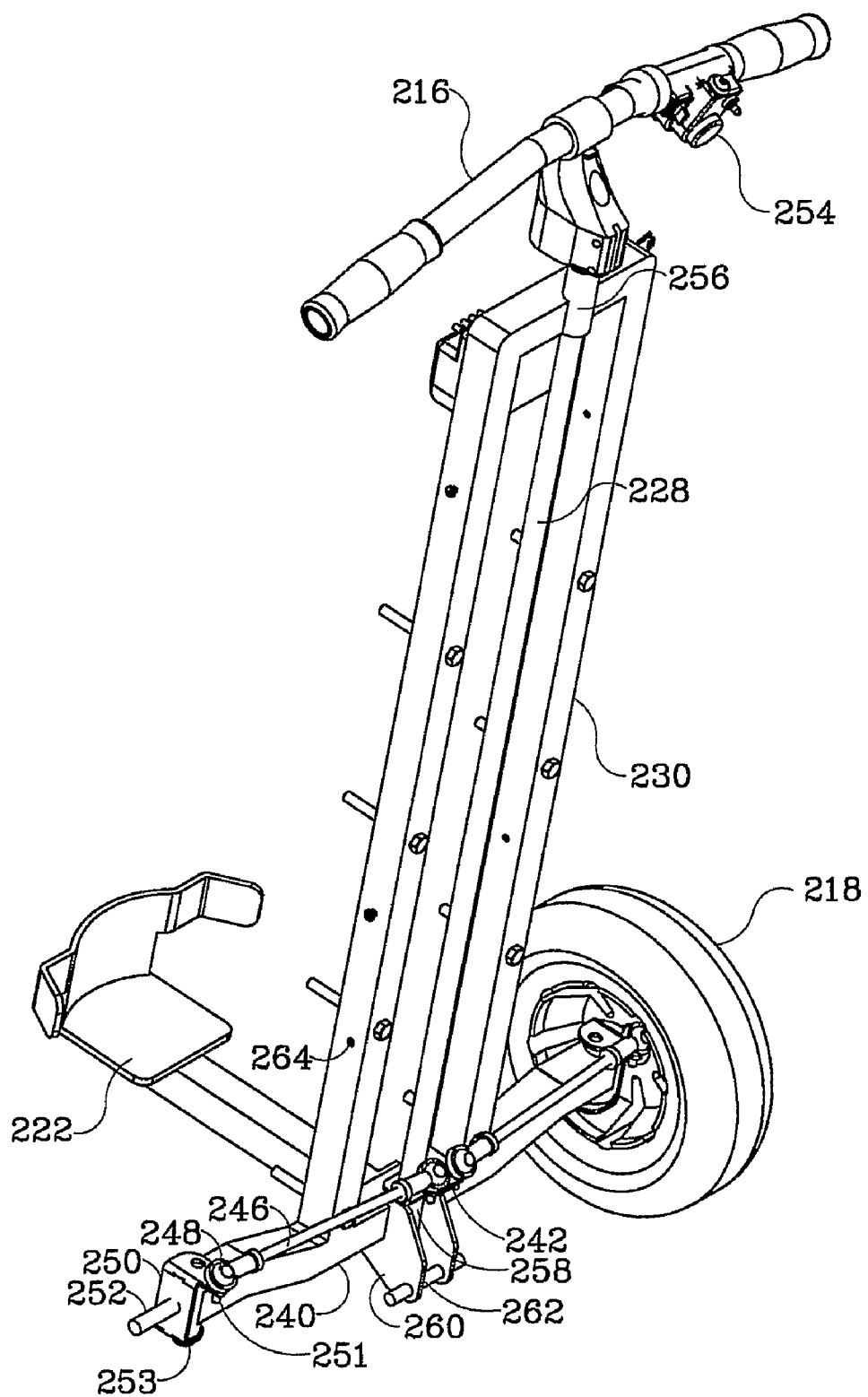
Figure 19:
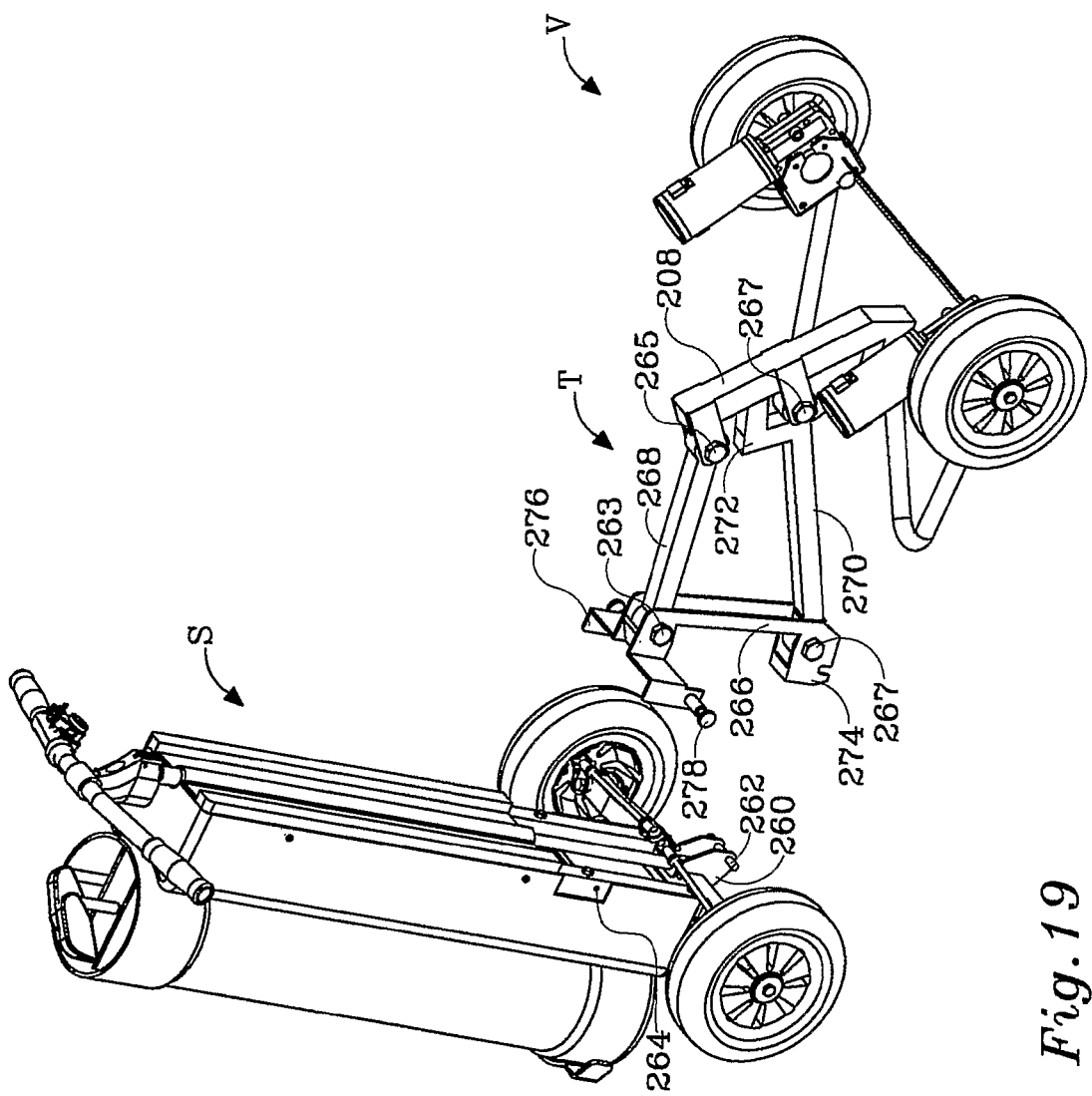
Figure 20:
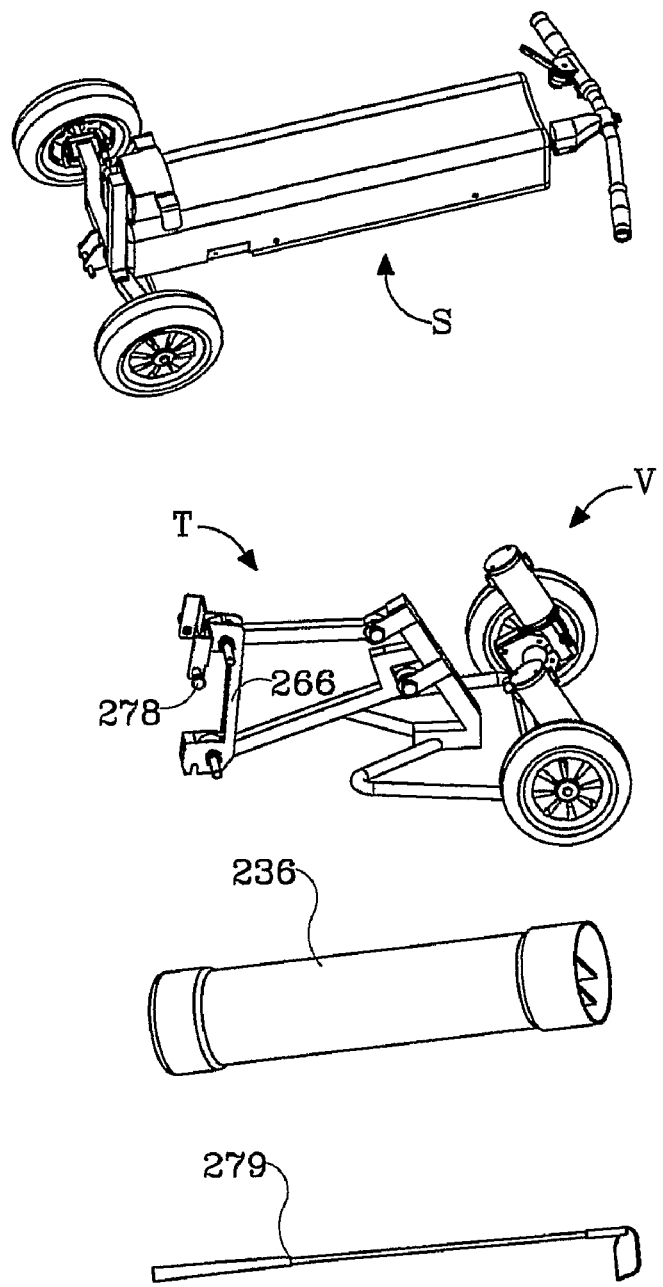
Figure 21:
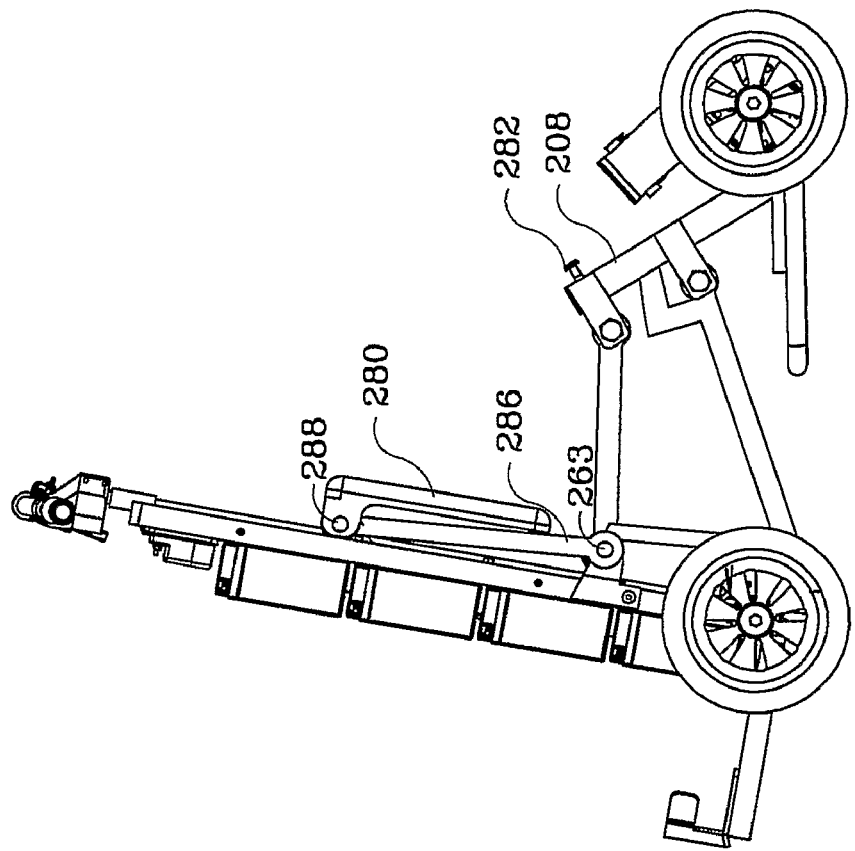
Figure 22:
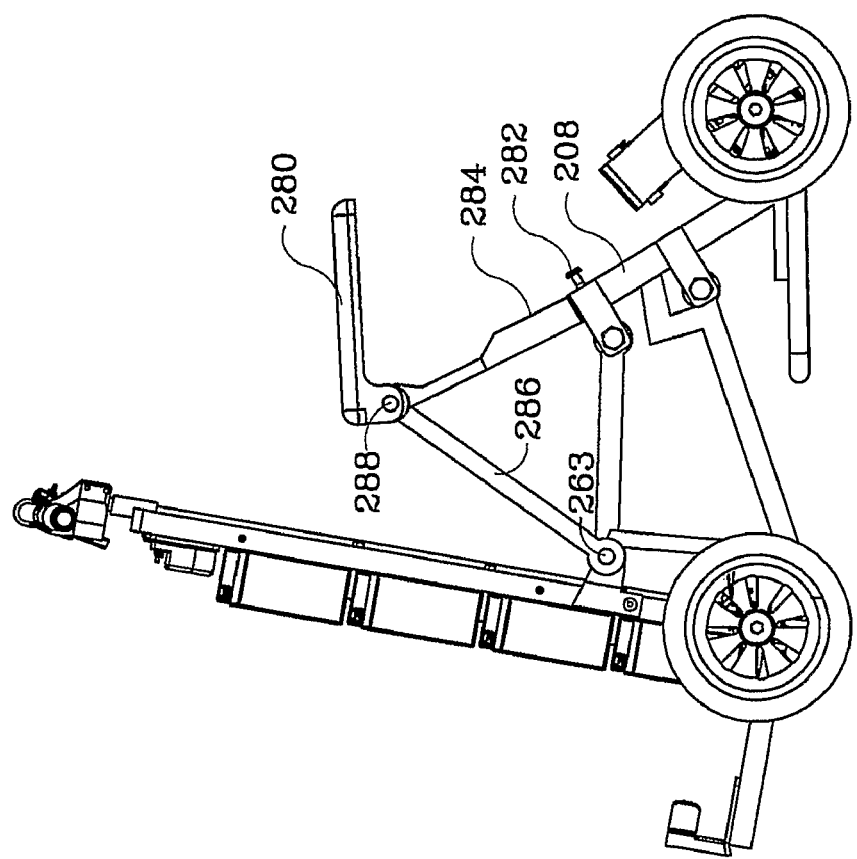

FIG. 12 is a perspective view of the three pieces shown in FIG. 11 ready for transport in a car baggage compartment;

FIG. 13 is a side view of a second embodiment of the present invention, showing the cart with the operational mode selected for walking;

FIG. 14 is a side view of the second embodiment of the present invention, showing the cart with the operational mode selected for riding;

FIG. 15 is a perspective view of the second embodiment, shown from the back end of the cart, operatively selected for the walking mode;

FIG. 16 is a different perspective view of the second embodiment, shown from the back end of the cart, operatively selected for the riding mode;

FIG. 17 is a perspective view of the second embodiment, operatively selected for the riding mode, with the golf bag and steering column assembly covers removed;

FIG. 18 is a perspective view of the steering column assembly according to the second embodiment of the present invention, with the golf bag, covers, batteries, and left wheel removed;

FIG. 19 is a perspective view of the second embodiment, showing the cart dismantled for transportation;

FIG. 20 is a perspective view of the second embodiment, showing the dismantled parts ready for transportation;

FIG. 21 is a side view of the second embodiment of the present invention, with an optional foldable saddle shown in its folded state, and FIG. 22 is a side view of FIG. 21, with the optional foldable saddle shown ready for use.

DETAILED DESCRIPTION OF THE PREFERRED EMBODIMENT

Figure 1:
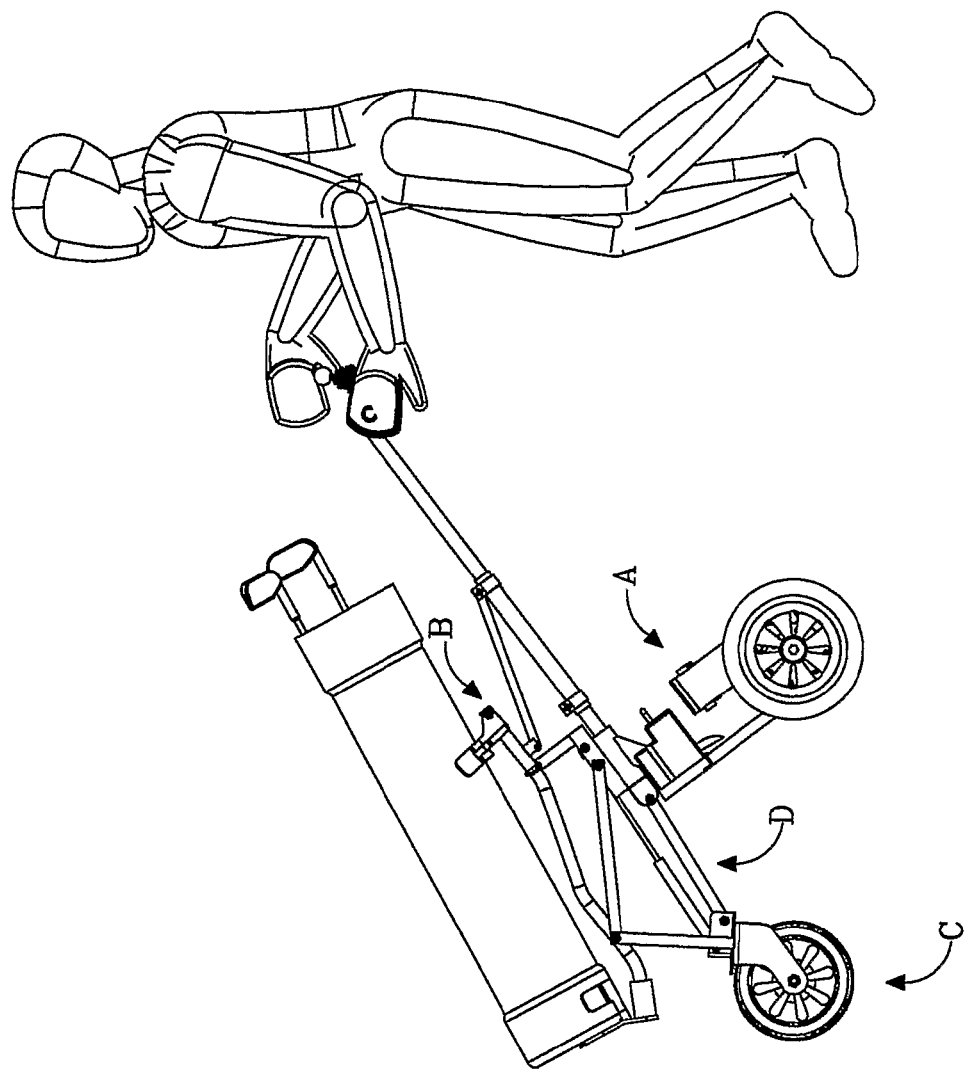
Figure 2:
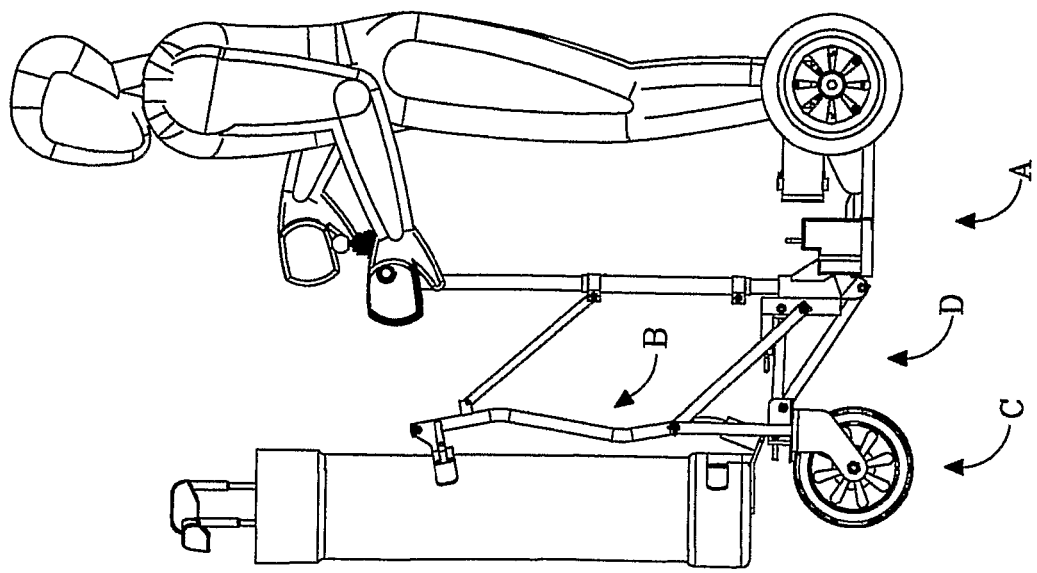

With reference to the drawings and specifically to FIGS. 1 and 2, the collapsible, dual mode walking/riding golf cart according to the present invention, is composed of three basic units, namely: a drive/riding unit generally referenced A, a golf bag support unit, generally referenced B, and a front caster wheel assembly, generally referenced C. These three units are interconnected for cooperative association in the two operative modes utilizing bar linkage systems, having two stable positions. The entire bar linkage system, including bars, a spring or actuator, pivot pins or bolts, and stops, is generally referenced D.

Figure 3:
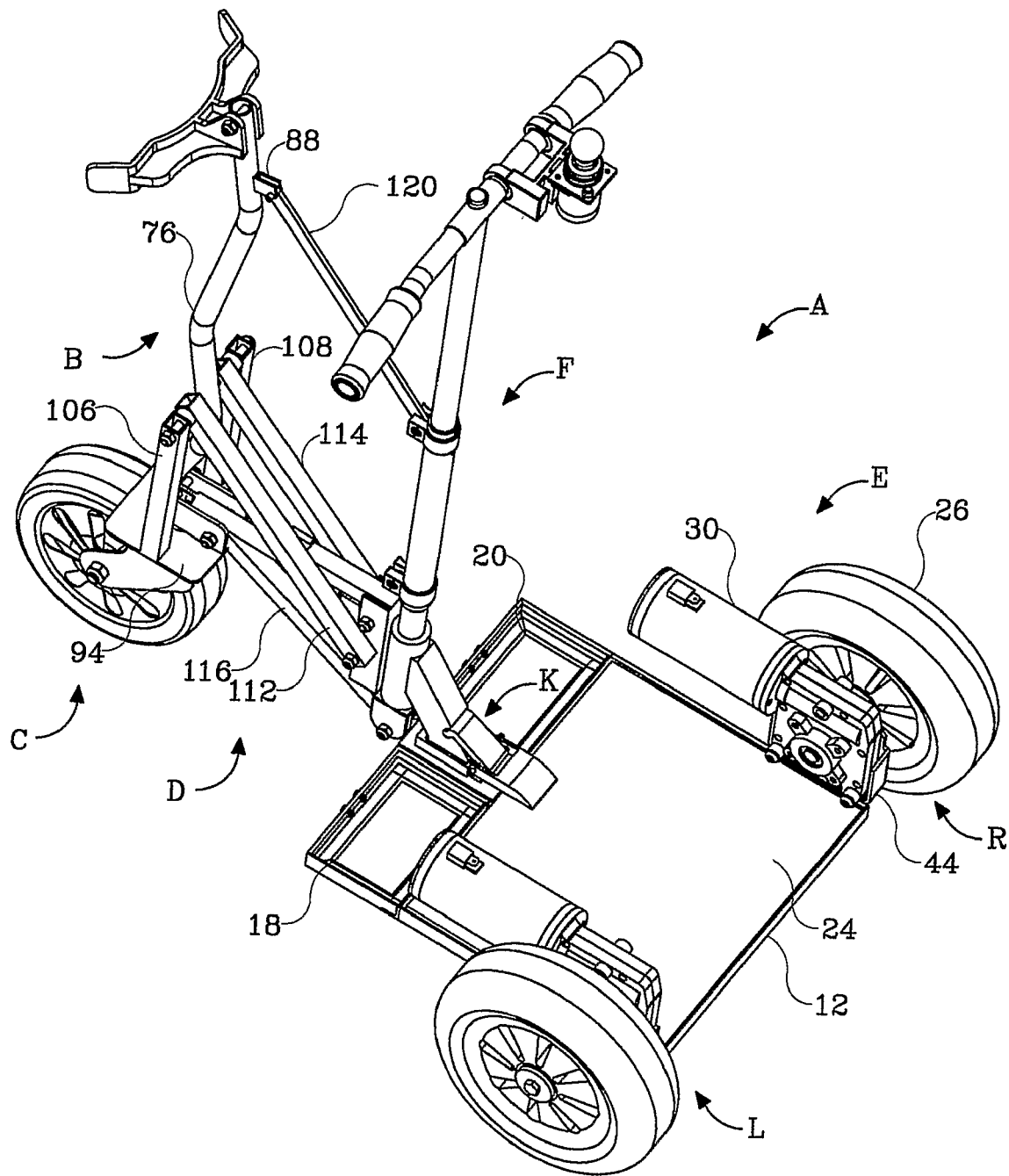
Figure 7:
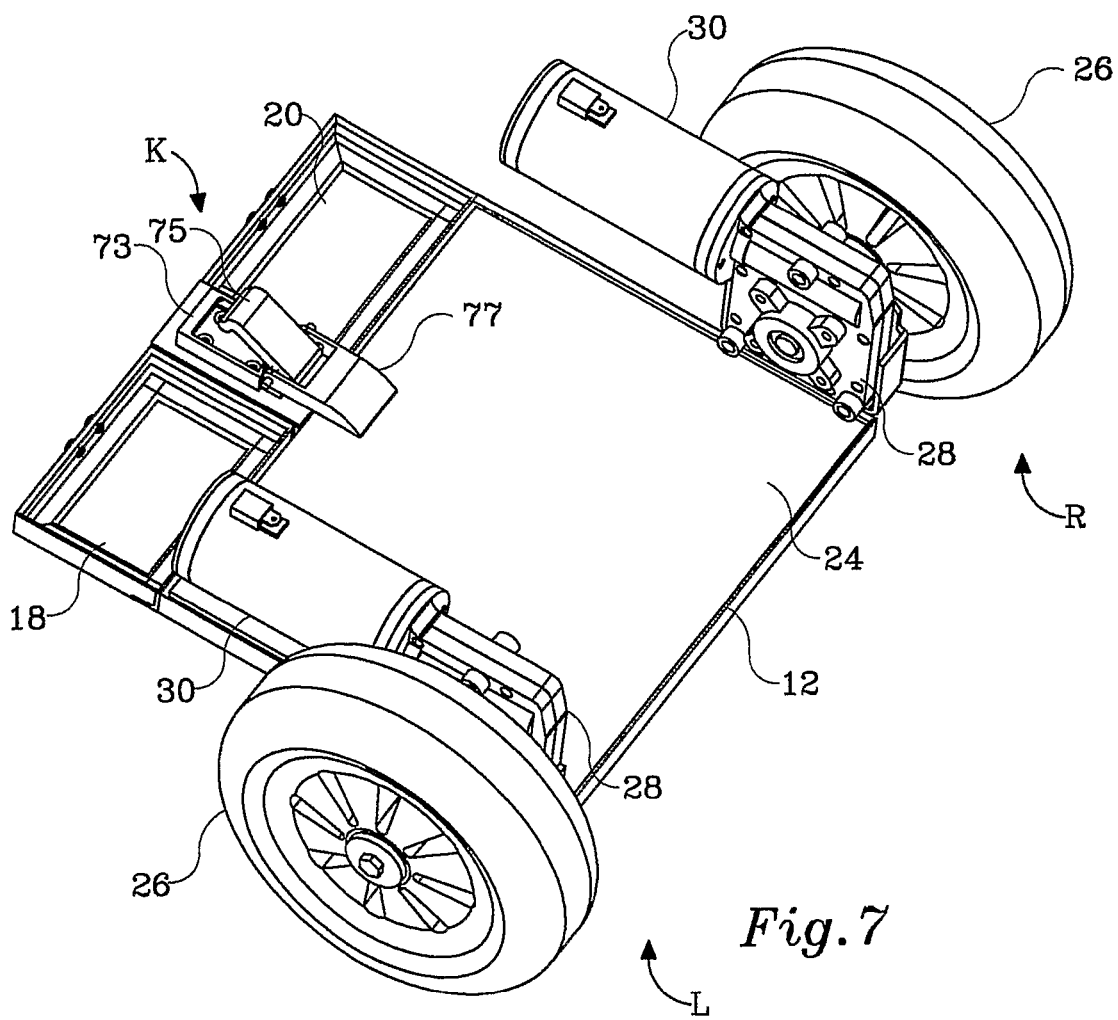

Referring to FIG. 3, there is illustrated in detail the drive/riding unit A which is composed of a step/drive unit generally referenced E and steering column assembly generally referenced F. The units E, F are detachably connected by a quick release lock assembly generally referenced K. The step/drive unit E, further includes pair of laterally spaced, independent, right and left drive assemblies generally referenced R and L, respectively, mounted on the side edges of a frame 12, at the rear end of the frame. A battery/electronic compartment unit 14 (FIG. 4) contains two batteries and control circuits, bridged by a carrying handle 16, is detachably located at the front end of the frame 12 in suitable seats 18, 20 (FIG. 7) clearing the center portion to the lock assembly K. A step-on board 24, preferably made of a perforated, anti-skid surface, is placed in the open area of the frame 12 between the drive units R and L. Each of the drive assemblies R, L is further composed of a drive wheel 26 attached to a high ratio worm gear reducer 28 powered by electric motor 30. The wheel 26 of the right drive unit R is assembled to the right of the gear 28, and a similar wheel 26 of the left drive unit L is assembled to the left of the gear 28, allowing the use of similar standard components on both sides.

Figure 9:
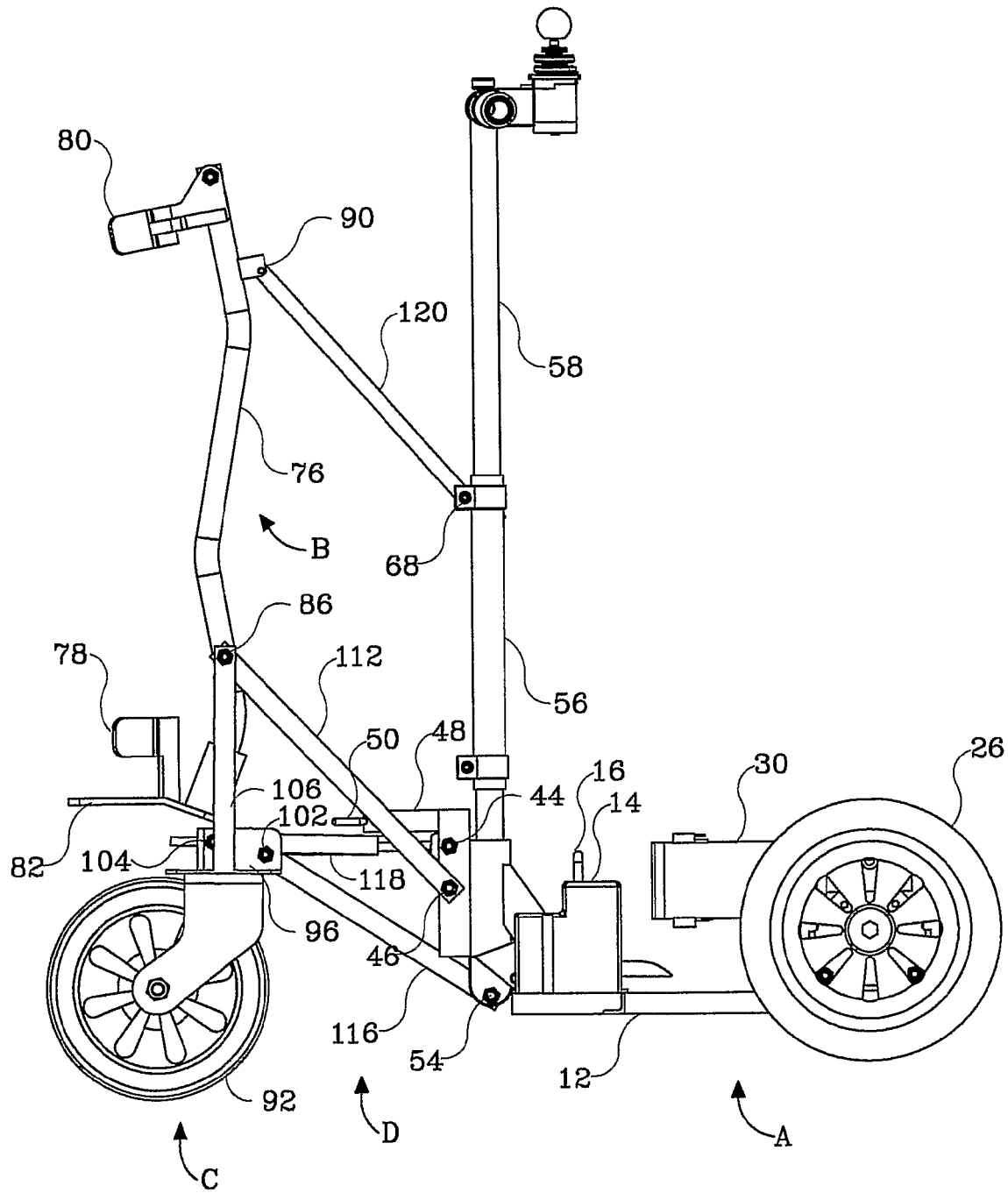

The steering column assembly F (FIG. 5) further includes a tubular support 34 held by an inclined reinforcing section 36 welded, or otherwise firmly attached to the support 34 at one end, and detachably attached to the frame 12 at the other end, by means of the lock assembly K. A U-shaped bracket 42, bored in two places on both side walls to accept the pivot pins or bolts 44, 46, (FIGS. 9, 10) is welded, or otherwise fixed to, the front side of the support 34 with its open side facing towards the front. A stop bar 48, with a fork 50 at one end, protrudes forwardly at the upper end of bracket 42 to serve as a stopper in the walk-behind mode. A short U-shaped bracket 52, bored on both side walls to accept a through passing pivot pin or bolt 54 (FIGS. 9 and 10), is welded, or otherwise fixed, to the bottom of the support 34 with its open side facing downwards.

The steering column assembly F (FIGS. 5 and 6) is further composed of a tubular member 56 advantageously slideably clamping an extension pipe 58 with a handle bar 60 at its top end. Handle bar 60 supports on its right side close to the grip handle an adjustable seat 66 advantageously holding a battery powered, remote radio controller 70 used for guiding the golf cart as will be explained below. At both end portions of the tubular member 56 there are provided collar clamps 62, 64 to enable adjustment of the handle bar 60 height. The top collar clamp 62 also accepts a pivot pin or bolt 68.

The handle bar 60 is not steerable, it is intended for gripping by the user especially while in the ride on mode to keep balance. Steering of the golf cart is carried out using the remote radio controller 70, equipped with a joystick ball 72. Slant of the joystick ball 72 towards the front, drives the cart straightforward, while slant for example, towards the right side, activates an electronic differential, located in the battery/electronic compartment unit 14 (FIG. 4), that applies more power to the left drive assembly L and less power to the right drive assembly R, for instance, by using an electronic pulse width modulation switching, which in turn, will force the cart to rotate to the right direction, as will be explained in detail hereinbelow. The remote radio controller 70 is fitted to the seat 66 by a retaining clip 74 that can be withdrawn from its seat 66 and held by the user (FIG. 6) while in the walk-behind mode, allowing the golfer to walk freely and operate the cart from a certain distance.

Advantageously, the controller 70 can be provided with a sensor detecting movement of the steering mechanism, for decreasing the traveling speed before or during executing a turn, namely, just before or during rotation, or otherwise movement of the steering mechanism. This decrease of speed increases the cart's safety and stability.

A direction detecting circuit, optionally fitted to the battery/electronic compartment 14, may detect the position of the remote controller 70 in relation to the golf cart and automatically direct the golf cart to follow the golfer, freeing the user completely from directing the golf cart while in this special optional mode.

Figure 8:
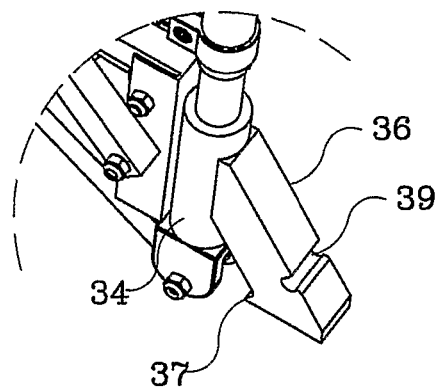

The lock assembly K (FIGS. 7 and 8), firmly attaches the step/drive unit E to the steering column assembly F. The lock K is composed of rectangular base 73 attached to the frame 12 between the battery compartment seats 18, 20. The base 73 is shaped as an open top box with an undercut grooved at the inner front wall. The bottom portion of the reinforcing section 36 fits into the base 73 by insertion of the notch 37 into the undercut groove of the base 73, and by rotation of the reinforcing section 36 until completely seated in the base 73. The lock step is completed by rotation of the swivel lock arm 75 into the slot 39 of the reinforcing section 36 and geometrically tightening the lock by forcing the lever 77 downwards.

The second basic unit of the dual mode golf cart is the golf bag support unit B (FIGS. 4 and 9), composed of a bent member 76, preferably formed of round tubing, having lower and upper golf bag support brackets 78, 80. Below the lower support bracket 78 there is a forwardly extending flat surface 82 for supporting the weight of the golf bag 84. The golf bag 84 is securely detachable to both the lower and upper brackets 78, 80, by any suitable means such as quick disconnect elastic straps (not shown). The bent member 76 is transversely bored at a certain distance above the lower bracket 78 to accept the pivot pin or bolt 86. A U-shaped bracket 88 is welded, or otherwise fixed, to the member 76 at a certain distance below the upper bracket 80 with its open side facing rearwards, bored on both side walls to accept pivot pin or bolt 90. The golf bag support unit B, including surface 82 and brackets 78, 80, is pivotably connected to the drive/riding unit A utilizing the bar linkage system D.

The third basic unit C (FIGS. 3, 4 and 9) of the dual mode golf cart, is the front caster wheel assembly, composed of a caster wheel 92 with its vertical axis swivel bearing upper plate (not shown), attached to a fixed plate 94. Above the fixed plate 94, there is a welded or otherwise fixed a U-shaped bracket 96, with its open side facing upwards, bored in two places on both side walls to accept pivot pins or bolts 102, 104. Two profile tubes 106, 108 are welded or otherwise fixed to the plate 94 and to the U-shaped bracket 96, directed upwardly on both sides of the U-shaped bracket 96. Both tubes 106, 108 are transversely bored near their top ends to receive a through-passing pivot pin or bolt 86.

The above-described three units A, B, C, are interconnected for cooperative association in the two operative modes, utilizing the bar linkage system D. The linkage system D is used to effectively connect the three units and to select between the two operative modes, and is per se known as the "four bar linkage system". This system is utilized here twice, first for connecting the golf bag support B to the drive/riding unit A, and the second use for connecting the front caster wheel assembly C to same drive/riding unit A. Each of the four bar linkage systems is composed of four solid members pivotally connected in four points using pivot pins or bolts.

Starting with the front caster wheel assembly C (FIG. 9), the imaginary straight line between pivot 102 and pivot 86 is considered one bar. On the drive/riding unit A the imaginary straight line between pivot 54 and pivot 46 is considered second bar. The pair of connecting bars 112, 114 (FIG. 3) between pivot 46 and pivot 86 is as a unit considered third bar, and the single bar 116, between pivot 54 and pivot 102, is the fourth bar. A spring unit 118, e.g., a gas spring unit, an electric actuator, an electronic controller or the like, is further connected to the four bar system between pivot 104 and pivot 44, which are not part of the four bar linkage system, but merely act to switch between the two operative modes. The relation between the lengths of the four bars in the bar linkage system, permits different angular displacement of the different bars, while the pivot joints are kept connected. The main advantage of using the four bar system will become clear when comparing between FIG. 9 and FIG. 10. Although the drive/riding unit A undergoes a significant angular displacement of about 60° from the horizontal axis, vertical axis rotation of the caster wheel assembly C, is kept vertical. It is this feature of the invention that allows the same steering effectiveness of the golf cart in the two operative modes. The use of an electronic differential system accompanied by the caster front wheel 92 correctly positioned in both operative modes, permits the steering of the cart by only changing the relative electric power supplied to the rear drive assemblies R and L. The caster wheel 92, when correctly positioned, will automatically accommodate the desired steering angle by virtue of its well-known construction.

Figure 4:
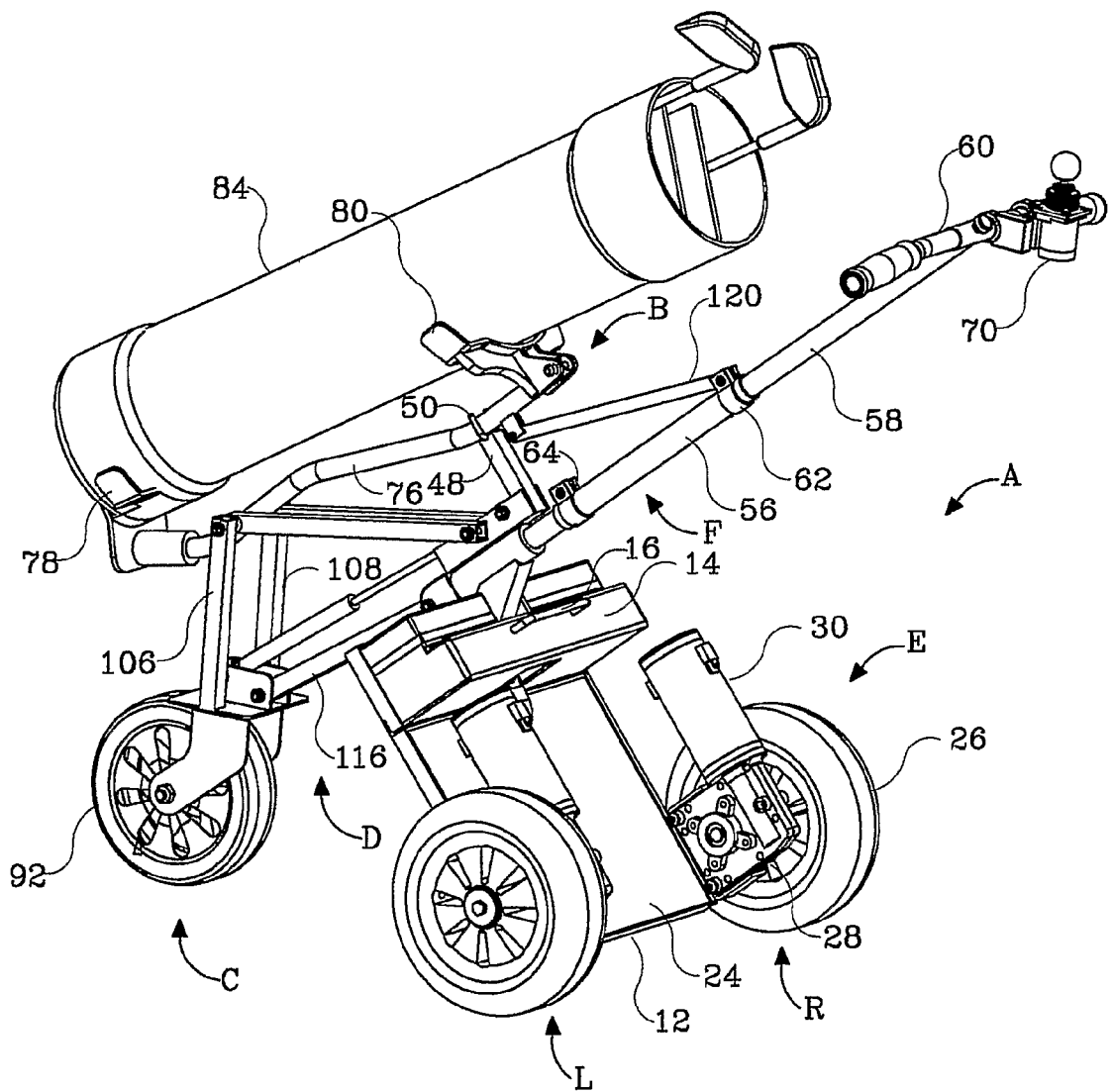

When a gas spring unit 118 is preferred, it will normally force the cart operative mode to the walk-behind mode, identified by the bent member 76 engaging into fork 50 of the stop bar 48 (FIG. 4). When the golfer wishes to select the ride-on mode, all which is required is to step on the inclined step-on board 24. The golfer's weight acting against the spring unit 118 will cause the spring unit 118 to retract, and the drive/riding unit A will lower slowly to the ride-on mode. When an electronic controller is preferred instead of a gas spring unit, a selection switch will be added on the handle bar 60, and the cart will accept one of the operative modes according to the selection by the user. The selected state will remain active until the other mode is selected using the selection switch.

Figure 10:
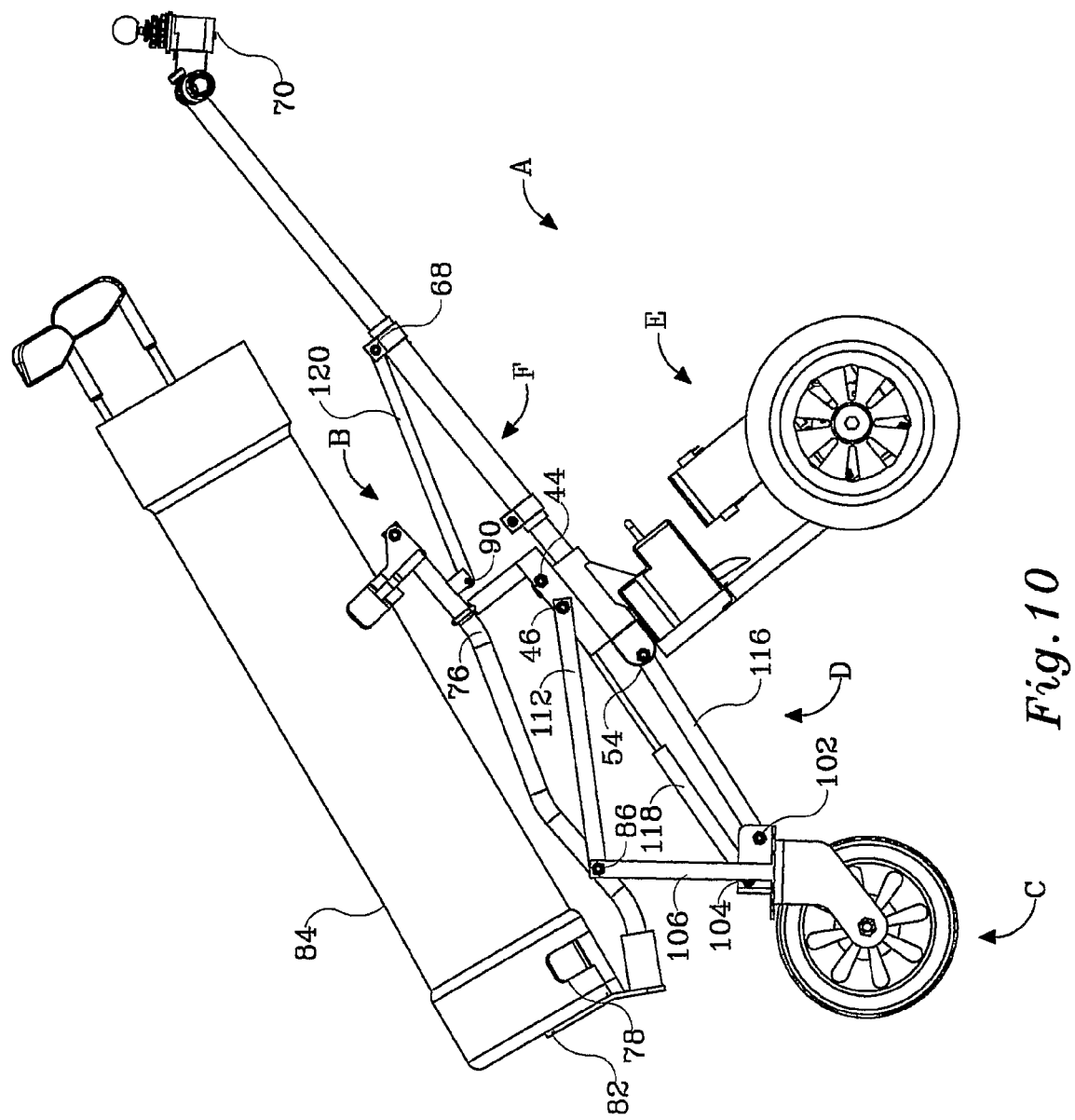

In a like manner, the golf bag support unit B is connected to the drive/riding unit A with a second set of a four bar system. Starting with the support unit B (FIGS. 9 and 10) the imaginary straight line between pivot 86 and pivot 90 is considered first bar. On the drive/riding unit A, the imaginary line between pivot 46 and pivot 68 is considered second bar. The pair of connecting bars 112, 114 between pivot 86 and pivot 46 are as a unit considered a third bar, which is common to both four bar linkage systems, and the single bar 120 between pivot 68 and pivot 90 is the fourth bar. Within this set of bars, the length of bar 120 is very similar to that of bar pair 112, 114 and the distance between pivots 86 to 90 is very similar to the distance between pivots 46 to 68, such that, in this instance, the golf bag support B will follow the angular displacement of the drive/riding unit A when selected to the walk-behind mode and will rest at about the same inclination angle as the steering column F, as shown in FIG. 10.

The golf cart may be dismantled quickly into three relatively compact and light units (FIG. 11). The order of dismantling is first to remove the battery/electronic compartment 14 then release the lock assembly K by lifting the lever 77. The three units can be easily transported in a car baggage as seen in FIG. 12.

A second embodiment of the present invention is illustrated in FIGS. 13 to 22. With reference to the drawings and specifically to FIGS. 13 to 16, the collapsible, dual walk-behind/ride-on mode golf cart according to the second embodiment of the present invention, is composed of two basic units, namely, a drive/riding unit generally referenced V, and a steering column assembly generally referenced S. These two units are interconnected for cooperative association in the two operative modes utilizing bar linkage system having two stable positions. The entire bar linkage system, including bars, pivot pins or bolts, and stops, is generally referenced T.

Referring to FIGS. 15 and 16, there is illustrated in detail the drive/riding unit V, which includes a pair of laterally spaced, independent, right and left drive assemblies generally referenced R and L respectively, mounted on the side edges of a frame 202, at the rear end of the frame. A step-on board 204, preferably made of a perforated, anti-skid surface, is placed in the open area of the frame 202 between the drive units R and L. The shape of the frame and step-on board, permit standing with both feet on the board, leaving a V-shaped, front central portion 206 clear, to permit collapsing of the unit to the step-behind mode (FIG. 15). The drive assemblies R and L are constructed similarly, as hereinabove described with reference to the first embodiment of the present invention. A linking member 208, with four drilled brackets 210, is welded, or otherwise firmly attached, to the center of the frame 202 directly behind the clear portion 206, service as first (rear) bar of the bar linkage system T.

The steering column assembly S, further includes a rotatable handle bar 216, linked to a pair of steering wheels 218, battery/electronic compartment 220, and golf bag support 222. The battery/electronic compartment 220 (FIG. 17), contains four batteries 224 and control circuits 226, and is vertically located at the front of the steering column 228. The batteries are attached to frame 230, having suitable front and rear covers 232, 234, shown open in FIG. 17. The front cover 232 also serves as an inclined seat to the golf bag 236. In contrast to the first embodiment of the present invention, here the handle bar 216 is steerable, and intended for gripping by the user for steering the cart in a bicycle-like manner.

The steering components (FIG. 19) include an axle 240 which is also the bottom edge of frame 230, a Pittman arm 242 located at the bottom end of the steering column 228, tie rods 246 with rod ends 248, knuckle 250 with steering arm 251, spindle 252, kingpin 253, and wheels 218. The handle bar 216, equipped with control switches 254, is attached to the top end of the steering column 228, which is rotatably held by top and bottom bearings 256, 258, fitted to frame 230. The relation between the lengths of Pittman arm 242, steering arm 251 and link positions, is preferably set by the Ackerman steering geometry (toe-out on turns), all per-se well known terms to the man skilled in the art of automotive industry. Two similar drilled brackets 260 welded, or otherwise firmly attached at the bottom of axle 240, support fixed pin 262, intended, in conjunction with drilled holes 264, at both sides of frame 230, for detachably connecting the steering assembly S to the second (front) bar 266 (FIG. 19) of the bar linkage system T. Golf bag support 222 extends forwardly from the center of axle 240.

The above-described two units V and S, are interconnected for cooperative association in the two operative modes, utilizing the bar linkage system T. The basics of the linkage system were discussed above in relation to the first embodiment of the present invention. Here, the four bars are located between pivot pins or bolts 263, 265, 267, 269 (FIG. 19). The operation principles are the same as in the first embodiment, however, a spring, gas spring, or actuator, are not needed here as the weight of the steering column assembly and battery pack is to distributed as to keep the two stable modes by weight balance only. The third (top) bar 268 and fourth (bottom) bar 270, equipped with stopper extension 272, are pivotally connected to the first (rear) bar 208, and to the second (front) bar 266 of the bar linkage system T. The second bar 266 includes a bottom slotted protrusion 274, and two extensions 276 with pullable release knobs 278, for easy dismantling of the cart, as will be hereinafter further explained.

When the handle bar is pulled rearwards, it will force the cart operative mode to the stable walk-behind mode, identified by the stopper extension 272 resting against the top bar 268 (FIG. 13). When the golfer wishes to select the ride-on mode, all that is required is to step on the inclined step-on board 204. The golfer's weight acting against the weight of the inclined steering assembly, forces the drive/riding unit A to lower to the stable ride-on mode, identified by the stopper extension 272 resting against the rear bar 208 (FIG. 14). Each selected state will remain active until the other mode is manually selected.

The golf cart may be dismantled quickly into two relatively compact and light units (FIGS. 19 and 20). The dismantling is performed by pulling the release knobs 278, located on both sides of the second (front) bar 266, the knobs eject locking pins (not shown) out of holes 264 in frame 230, and lift the front bar to disengage the bottom protrusion 274 from its engagement with the brackets 260 and pin 262. The two units, namely, steering column assembly S and drive/riding unit V with bar linkage system T, along with golf bag 236 and golf clubs 279 (FIG. 20) can be easily transported in a car baggage.

Referring to FIGS. 21 and 22, a foldable saddle 280 can be optionally fitted to the cart. The saddle is shown in its folded state in FIG. 21 and ready to use in FIG. 22. Pullable knob 282 locks extension 284 into the hollow bar 208, a link 286 is pivotally attached to pivot pin or bolt 263 at one end, and to the extension 284 with pivot pin or bolt 288, at the other end. The saddle is pivotally attached to the same pivot pin or bolt 288 used by the link 286 and extension 284. A one-way releasable spring lock (not shown) retains the raised position of the saddle while in use.

As clearly seen in the Figures of both embodiments of the present invention, while the cart operative mode is in the ride-on mode, the step-on board 24 or 204 is disposed very close to the ground. This is also related to the fact that the drive assemblies R and L are mechanically independent, and there is no need for a differential unit and transverse drive axle. The space between the drive assemblies is free to accept the step-on board 24 or 204 such that the entire golf cart has a low center of gravity even though the driver operates the cart from a standing position. As further seen in the Figures the wheelbase in the ride-on mode is significantly longer than that of the walk-behind mode, improving the desired ground holding of all three or four wheels when heavily loaded. On the other hand, when in the walk-behind mode, the cart is not heavily loaded and short wheelbase is desired for easy handling and steering. The handle bar 60 or 216 is ergonomically situated in both operating modes to permit a comfortable walk or ride of the golfer.

As hereinabove described in detail, the proposed dual mode golf cart is very easily selectable between the two operative modes, the steering has the same effectiveness at both operative modes, the wheelbase is about 30% shorter when selected to the walk behind mode, and the cart is collapsible for easy transportation in a car baggage.

The golf cart of the present invention is suitable for civil applications such as applications in warehouses, shopping centers, etc., in which such a cart requires high maneuverability, as well as suitable to be utilized for transportation and transport of loads over larger distances.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A battery powered golf cart with selectable dual operative modes, walk-behind mode and a ride-on mode, comprising three units: a drive/riding unit having a pair of drive wheels defining a wheel base, said drive/riding unit including a battery compartment for housing a battery, a golf bag support unit, and a front caster wheel unit, said three units being interconnected for cooperative association in said two operative modes by a bar linkage system, having two stable positions, wherein in the ride-on mode, the wheel base is longer than in the walk-behind mode; wherein the drive/riding unit further comprises a foldable step/drive portion coupled to a manually tiltable steering column assembly portion having a handle bar; and the bar linkage system is articulated between the golf bag support unit and the steering column assembly portion and is configured to raise or lower a point of attachment of the step/drive portion to the steering column assembly portion by a user manually tilting the steering column assembly portion forwards or backwards, respectively, thereby reducing or extending the wheel base and folding or unfolding the step/drive portion.

2. A battery powered golf cart as claimed in claim 1, wherein said drive/riding unit further comprises a pair of laterally spaced, independent, right and left drive assemblies, powered by an electronic differential unit, selectively applying more power to one drive assembly than to the other drive assembly.

3. A battery powered golf cart as claimed in claim 1, wherein said caster wheel assembly further comprises a caster wheel and one bar of said bar linkage system.

4. A battery powered golf cart as claimed in claim 1, wherein said bar linkage system further comprises two or more free bars connecting between one bar of the drive riding unit and one bar of said caster wheel assembly with the aid of pivot pins or bolts.

5. A battery powered golf cart as claimed in claim 4, wherein said bar linkage system assumes two stable positions corresponding to the dual operative modes.

6. A battery powered golf cart as claimed in claim 5, wherein a vertical rotation axis of said caster wheel unit is kept vertical while in the two stable positions of the bar linkage system corresponding to the two operative modes.

7. A battery powered golf cart as claimed in claim 1, wherein the step/drive portion is fixed to the steering column portion by a detachable lock assembly.

8. A battery powered golf cart as claimed in claim 2, wherein said electronic differential unit is remotely operated with a remote radio controller.

9. A battery powered golf cart as claimed in claim 1, wherein said walk-behind operative mode is automatically assumed by the force of a spring acting on said bar linkage system.

10. A battery powered golf cart as claimed in claim 1, wherein selection between said walk-behind operative mode and ride-on operative mode is assisted with an electronic controller acting on said bar linkage system, and wherein said electronic controller is selectively toggled by an electric switch.

11. A battery powered golf cart as claimed in claim 1, wherein the battery compartment is detachably removable from the drive/riding unit.

12. A battery powered golf cart as claimed in claim 7, wherein the three units of said golf cart are dismantled by removal of said battery compartment and release of the said lock assembly.

13. A battery powered golf cart as claimed in claim 1, wherein said golf bag support unit further comprises supporter for the golf bag and one bar of the said bar linkage system.

14. A battery powered golf cart as claimed in claim 1, wherein said drive/riding unit further comprises at its front end, as part of the drive/riding unit, a second bar of the bar linkage system.

15. A battery powered golf cart as claimed in claim 13, wherein said bar linkage system further comprises at least one additional free bar connecting between a second bar of the drive/riding unit and said one bar of said golf bag support unit, with the aid of pivot pins or bolts.

16. A battery powered golf cart as claimed in claim 1, wherein the handle bar height of said steering column assembly is adjustable.

17. A battery powered golf cart as claimed in claim 1, wherein the step/drive portion includes a step-on surface which in the ride-on mode is configured to allow a golfer to stand intermediate the steering column assembly portion said pair of drive wheels in the drive/riding unit.

18. A battery powered golf cart as claimed in claim 1, wherein the two operative modes are stabilized by weight balance distribution of the steering column assembly in the two operative modes, such that in the walk-behind mode the battery is moved toward the rear of the golf cart so as to maintain a center of gravity of the golf cart between the front caster wheels and the handle bar.

* * * * *

UNITED STATES PATENT AND TRADEMARK OFFICE
CERTIFICATE OF CORRECTION

PATENT NO.        : 8,365,850 B2                                              Page 1 of 1
APPLICATION NO.   : 11/996652
DATED             : February 5, 2013
INVENTOR(S)       : Gal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1071 days.

Signed and Sealed this
First Day of September, 2015

Michelle K. Lee
*Director of the United States Patent and Trademark Office*